(12) United States Patent
Gillum et al.

(10) Patent No.: US 7,571,319 B2
(45) Date of Patent: Aug. 4, 2009

(54) VALIDATING INBOUND MESSAGES

(75) Inventors: Eliot C. Gillum, Los Gatos, CA (US);
Chun Yu Wong, Sunnyvale, CA (US);
Ilya Mironov, Mountain View, CA (US);
Aditya Bansod, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 10/965,058

(22) Filed: Oct. 14, 2004

(65) Prior Publication Data
US 2006/0085505 A1 Apr. 20, 2006

(51) Int. Cl.
*H04L 9/00* (2006.01)
(52) U.S. Cl. .................. 713/168; 713/155; 713/170; 726/13; 726/23; 726/24; 380/229
(58) Field of Classification Search ............. 713/155, 713/168, 170; 726/13, 23, 24; 380/229
See application file for complete search history.

(56) References Cited

U.S. PATENT DOCUMENTS

| 6,640,301 | B1 | 10/2003 | Ng |
| 2002/0016824 | A1 | 2/2002 | Leeds |
| 2003/0149726 | A1* | 8/2003 | Spear .................. 709/206 |
| 2003/0177188 | A1 | 9/2003 | Brubacher et al. |
| 2003/0204569 | A1* | 10/2003 | Andrews et al. ............ 709/206 |
| 2005/0137983 | A1* | 6/2005 | Bells ........................ 705/51 |
| 2006/0036693 | A1* | 2/2006 | Hulten et al. .............. 709/206 |
| 2006/0053202 | A1* | 3/2006 | Foo et al. .................. 709/206 |

OTHER PUBLICATIONS

Ritter, Maxime, (Non-filtrage de Spam base sur le Message-IS, http://www.web.archive.org/web/200401103294/maxime.ritter.edu.org/article.php3?id_article=2), Dec. 1, 2003, Translation, Non-Spam filtering based on the Message-ID, pp. 1-9.*
Ritter,Maxime, "Non-filtrage de Spam basé sur le Message-ID", http://web.archive.org/web/20041011032947/maxime.ritter.eu.org/article.php3?id_article=2>, Oct. 9, 2004.
P. Resnick, "Internet Message Format", Network Working Group, Request for Comments: 2822, Qualcomm Incorporated, Apr. 2001.

(Continued)

*Primary Examiner*—Kambiz Zand
*Assistant Examiner*—Tongoc Tran
(74) *Attorney, Agent, or Firm*—Vierra Magen Marcus & DeNiro LLP

(57) ABSTRACT

A system and method for verifying messages. The method may include the steps of receiving an inbound message and characterizing the inbound message by analyzing a latent cryptographic identifier in the inbound message. The identifier is generated by a recognized message system, which may be the receiving system itself, for an outbound message. Characterizing may involve detecting if the latent cryptographic identifier is present and determining if the cryptographic identifier is valid. The step of determining can be performed using symmetric or asymmetric methods of verifying the authenticity of the message.

50 Claims, 6 Drawing Sheets

MessageID: [localpart][R][MAC][RH][TH][V]@[domainname]> ⟵ 406

For example: ⟵ 406a
Message-ID: <local-1D249E2AD925B19CE14F29DA40@somename.com>

OTHER PUBLICATIONS

W.D. Hopkins, "Transaction Incrementing Message Authentication Key", IBM Technical Disclosure Bulletin, IBM Corp., Jun. 1983, vol. 26, No. 1, pp. 199-201.

R.R. Jueneman, et al., "Message Authentication", IEEE Communications Magazine, Sep. 1985, pp. 29-40, vol. 23, No. 9.

D. Crocker, "Bounce Address Tag Validation (BATV)," www.brandenburg.com, May 2004.

J. Levine, et al., "Bounce Address Tag Validation (BATV)," www.brandenburg.com, Sep. 2004.

* cited by examiner

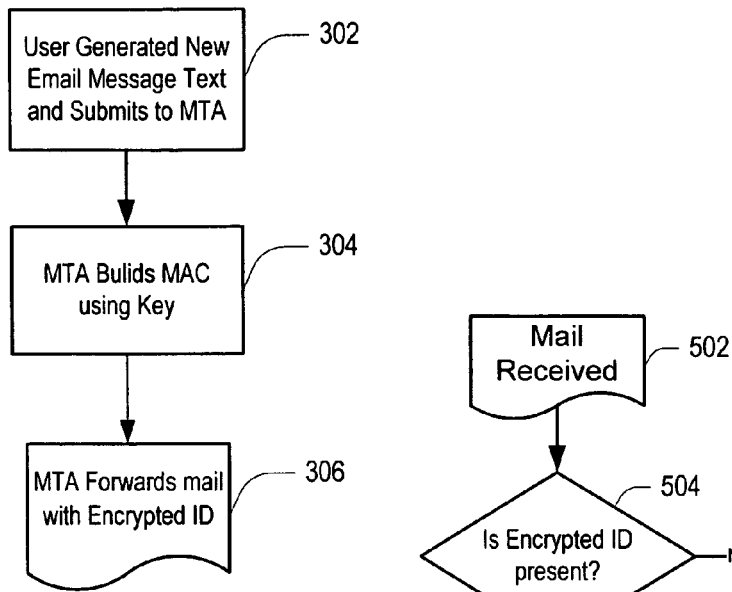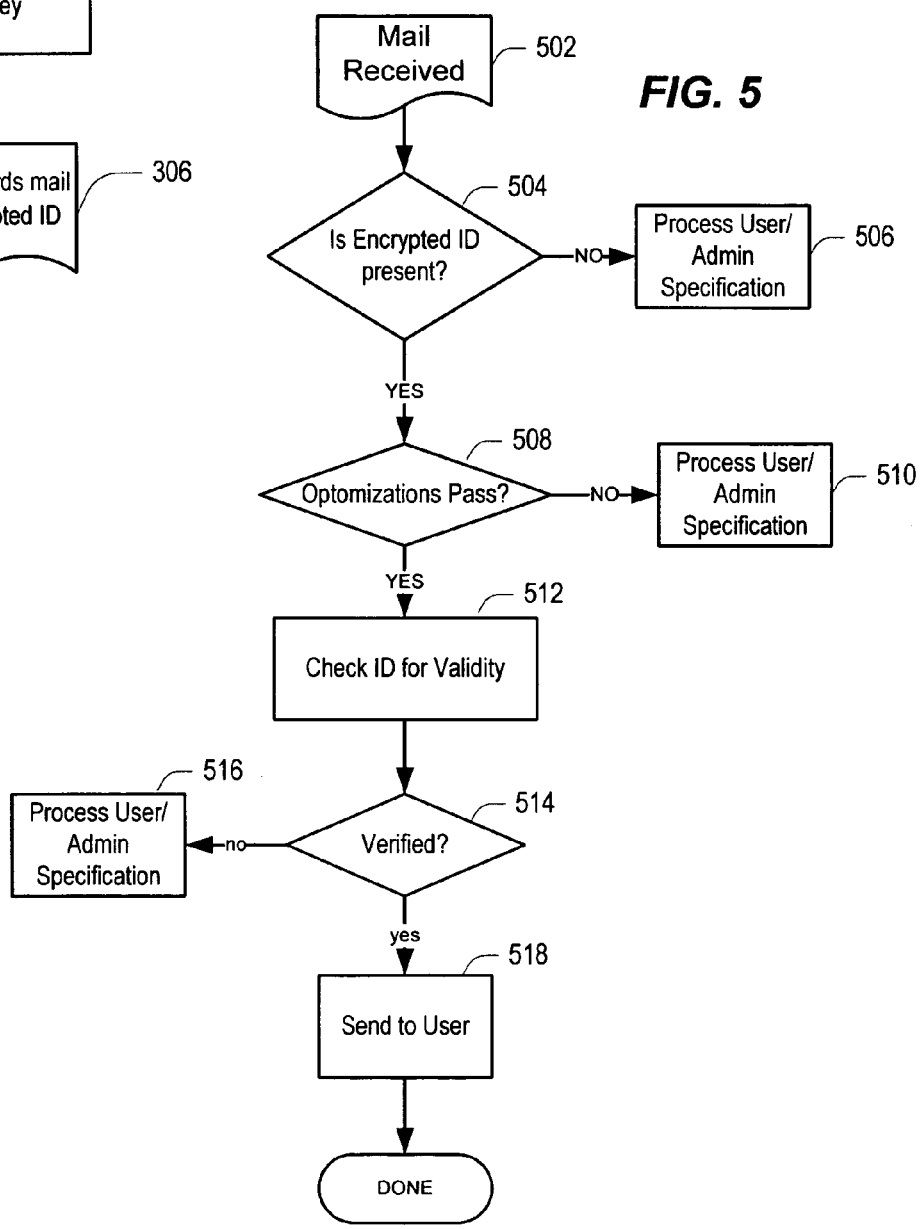

FIG. 4A

```
From: John Doe <jdoe@machine.example>
To: Mary Smith <mary@example.net>
Subject: Saying Hello
Date: Fri, 21 Nov 1997 09:55:06 -0600        402a
Message-ID: <1234@local.machine.example>

This is a message just to say hello.
So, "Hello".
----
```
402

FIG. 4B

```
----
From: Mary Smith <mary@example.net>
To: John Doe <jdoe@machine.example>
Reply-To: "Mary Smith: Personal Account" <smith@home.example>
Subject: Re: Saying Hello
Date: Fri, 21 Nov 1997 10:01:10 -0600
Message-ID: <3456@example.net>
In-Reply-To: <1234@local.machine.example>        404a
References: <1234@local.machine.example>

This is a reply to your hello.
----
```
404

```
MessageID: [localpart][R][MAC][RH][TH][V]@[domainname]>
```
406

For example:
```
Message-ID: <local-1D249E2AD925B19CE14F29DA40@somename.com>
```
406a

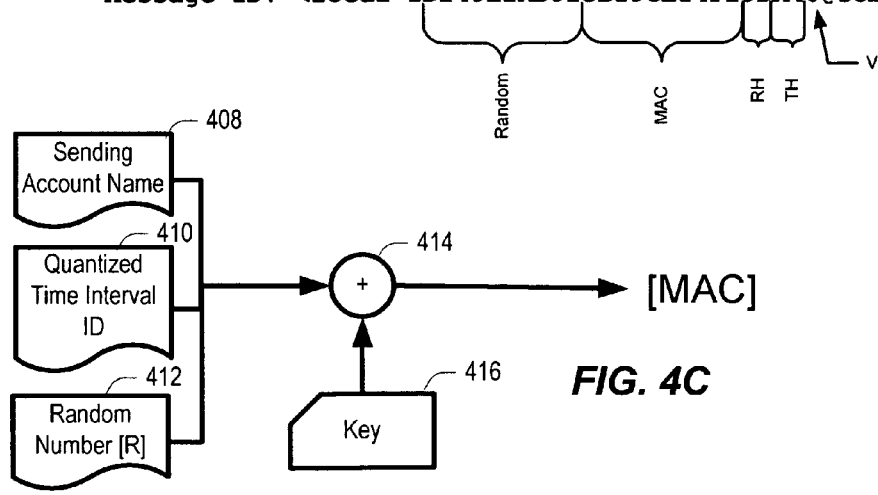

FIG. 4C

VALIDATING INBOUND MESSAGES

BACKGROUND OF THE INVENTION

1. Field of the Invention

The present invention is directed to distinguishing legitimate messages from spam messages.

2. Description of the Related Art

While spam is generally thought of as unsolicited email transmitted on the Internet, spam can be transmitted by any messaging medium. Because of the volume of email spam now sent on the Internet, spam has become a major problem for Internet users. To combat this problem, spam filters have been implemented at various parts of the messaging path. Spam filters can be run by users when incorporated into their mail user agent (MUA), enterprises when incorporated into or operated in conjunction with a message transfer agent (MTA), Internet Service Providers and other email domains.

A spam filter is a program that is used to detect unsolicited and unwanted massages and prevent those messages from getting to a user's inbox. A spam filter looks for certain criteria on which it bases judgments on whether a message comprises spam or not. The simplest spam filters watch for particular words in the subject line of messages and to exclude these messages matching the watch words from a user's inbox. This method is not especially effective, too often omitting perfectly legitimate messages (called false positives) and letting actual spam through. More sophisticated programs, such as Bayesian filters or other heuristic filters, attempt to identify spam through suspicious word patterns or word frequency. Bayesian filters look for suspicious sets of message attributes that include, in part, word patterns and word frequency as well as fishy header fields, spoofed return addresses, and the like. Current-generation filters look at the aggregate of all these flags Certain types of messages are not spam at all, but may be identified as such by spam filters. For example, if a user sends an email to another user, and the other user sends a reply, a spam filter may render a false positive on the reply email. In addition, the purveyors of spam have become more sophisticated in hiding spam. Some spam takes the appearance of a reply message from a particular user, or falsely inserts a user's email into the "from" field of a message. This may appear to a spam filter as a legitimate email. Another technique, common to transmitting messaging viruses, is for spammers to use an impersonated email address in the from line of an email message, send the message with the impersonated "from" address to a user, which generates a non-delivery report (NDR) which returns with the virus to the impersonated user. In this technique, the virus is provided as an attachment to the non-delivery report. Email viruses also spread themselves to people in user address books by sending themselves and impersonating other users in the address book. Such viruses may be caught by the recipient's agent and generate an NDR with the virus stripped out.

Hence, in messaging environments, a method for verifying the authenticity of an inbound message would be useful.

SUMMARY OF THE INVENTION

The present invention, roughly described, pertains to method for verifying messages. The method may include the steps of receiving an inbound message and characterizing the inbound message. The characterization step involves analyzing a latent cryptographic identifier in the inbound message, where the identifier is generated by a recognized message system for an outbound message.

In a further embodiment, the step of characterizing comprises detecting if a latent cryptographic identifier is present and determining if the cryptographic identifier is valid. The step of determining can be performed using a symmetric or asymmetric method of verifying the authenticity of the message.

Alternatively, the invention is a method for validating an inbound email in a messaging system which includes the steps of extracting a cryptographic identifier generated from a known originating system from the inbound email; and comparing the identifier against a number of known valid message authentication code (MAC) values to determine whether the message originated with the known originating system.

In yet another embodiment, the invention is a messaging system. The messaging system may include an identifier generator providing a cryptographic identifier for a standard identification field in each message handled by the message transfer agent. The system may also include an identifier characterizer interpreting the content of the standard identification field in inbound messages to the messaging system.

In a further embodiment, the invention is a method for validating email. This embodiment includes a step of generating an encrypted latent signal in each outbound message output by a messaging system. Upon receipt of any inbound message by the messaging system, the method further includes: determining whether an encrypted latent signal in the inbound message is present; extracting a cryptographic identifier generated from a known originating system from the inbound email, and comparing the identifier against a number of known valid MAC values to determine whether at least a component of the message originated with the messaging system. In another alternative, cryptographic signatures are used, with the signature being verified by an algorithm that takes as an input the public key of the signer, the message, and the signature itself.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 3 is a block diagram of a method for generating an email message in accordance with the present invention.

FIG. 4A is an example of an original email message and a reply to the original email message.

FIG. 4B is an example of a Message-ID formed in accordance with the present invention.

FIG. 4C is a block diagram of a method for creating the Message-ID of FIG. 4B.

FIG. 5 is a flowchart illustrating the method for verifying a message in accordance with the present invention.

DETAILED DESCRIPTION

The invention provides a system and method for authenticating a message received at a messaging system. The method includes verifying whether the message received originated with the receiving system, or another known system, by checking an identifier in the received message.

Figure 1:
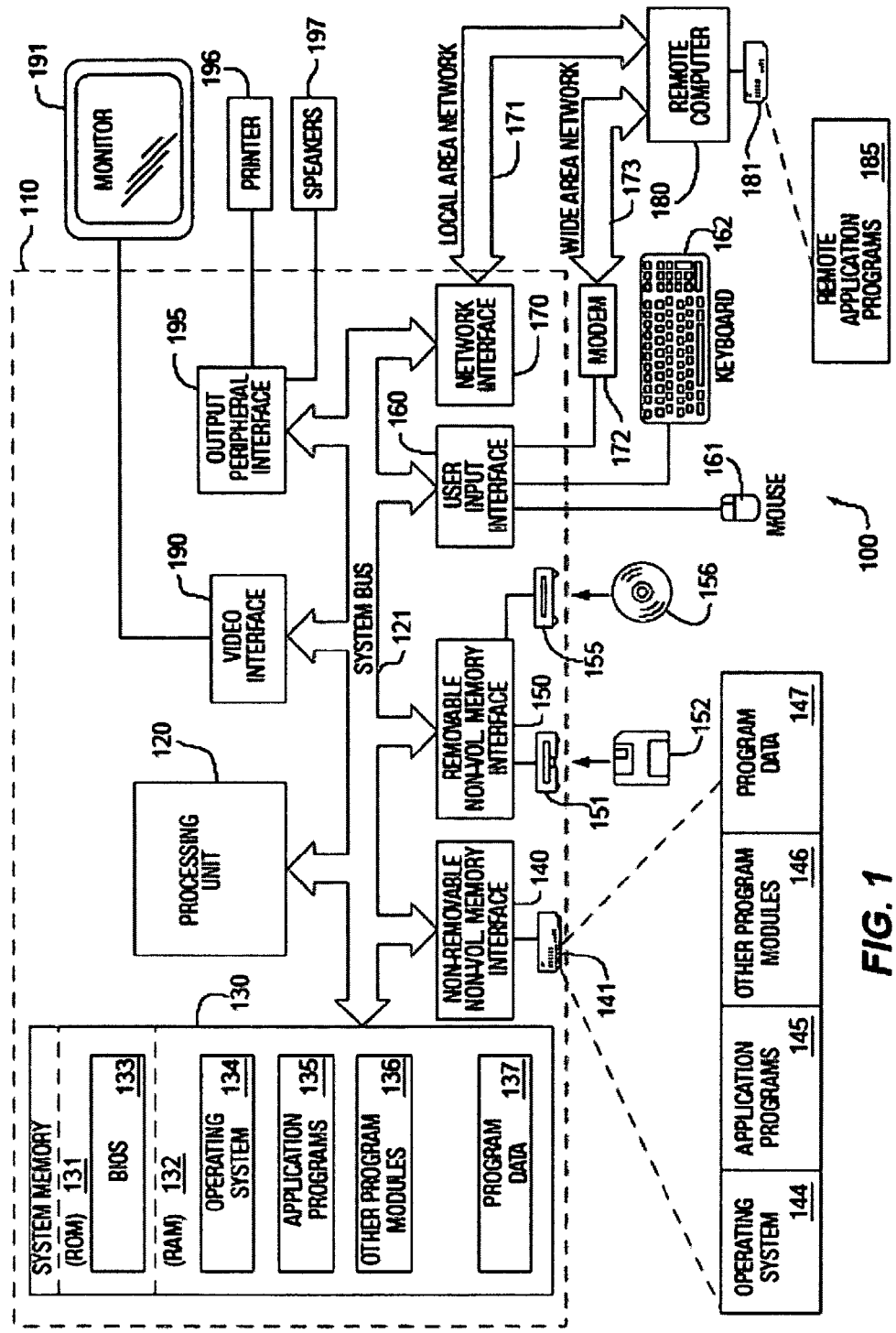
FIG. 1 depicts a block diagram of computer hardware suitable for implementing the invention.

FIG. 1 illustrates an example of a suitable general computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
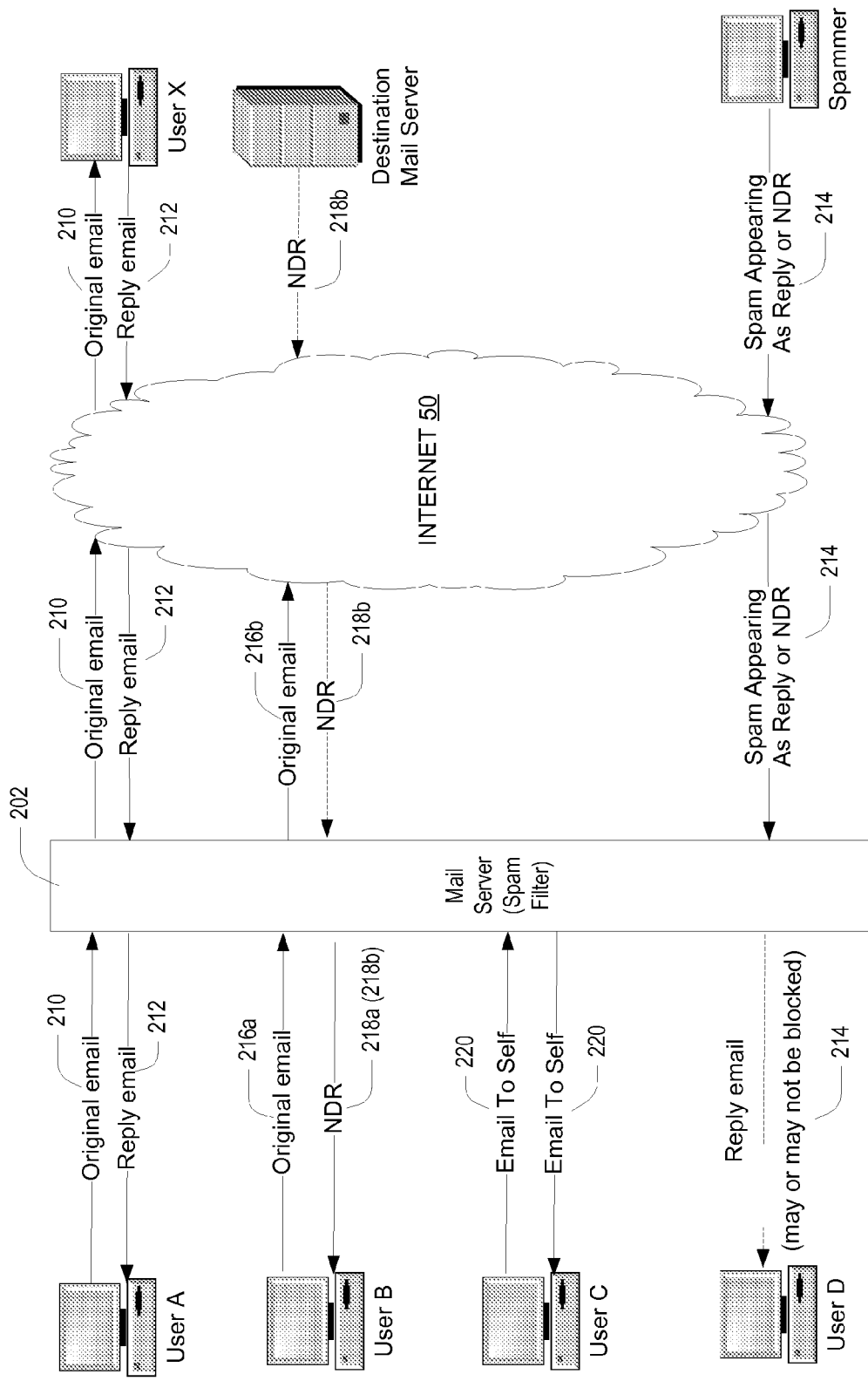
FIG. 2 is a block diagram illustrating various messaging scenarios wherein an email system should or should not adversely treat a message to a user.

FIG. 2 shows various types of email messages transmitted to and from a user. Generally, in cases where a user initiates an outbound mail message and an inbound message related to the outbound message is received by the user's messaging service, the inbound message should be returned to the user. This scenario may manifest in three general ways: an outbound mail message is replied to by the outbound message's intended recipient; the outbound message is undeliverable and hence a non-delivery report is generated by the user's or addressee's messaging system; or a user addresses a message to his/herself. In the examples of FIG. 2, each messaging system is described as an email system. However, it should be recognized that the messaging systems which would benefit from the present invention are not limited to email systems alone. For example, any messaging system capable of providing a latent identification field for use in accordance with the instant description may be used in accordance with the present invention, such as, for example, short message service (SMS) and Multimedia messaging service (MMS).

The first case is illustrated by User A who sends an original outbound email 210 to User X. The original email will be transmitted by User A's messaging system 202 to User X's system via Internet 50. User X generates a reply email 212 which is transmitted via the Internet 50 to User A's messaging system 202. Because the original email is generated by User A, and the email is a valid reply, User A's system should always pass the reply 212 to User A. Currently, depending on the nature of the spam filter active on email domain 202, there is no guarantee that the reply 212 will reach User A. The present invention corrects this potential false positive.

The second case is illustrated by User B. In this case, User B generates an original email 216 which is transmitted via the Internet to a destination mail server for a particular user. If the user is not found in the destination mail server, or the user's quota is over a prescribed limit, a non-delivery report 218A may be generated by the destination mail server and transmitted to User B. (It is also possible that the destination mail server will report an error at the protocol level when the local mail server delivers mail to it, and in such case the NDR will be generated by the local mail server.) Alternatively, if the email domain 202 cannot find the destination mail server, the NDR 218B is generated by domain 202. In both cases, since the NDR is in response to an outbound message by User B, User B should receive the NDR. As noted above, spam filters may be trained to catch NDRs due to the case illustrated with respect to User D: a spammer may generate a fake NDR 214 which transmits spam or a virus to the user. In this case, the NDR is fake, and the messaging system should filter the fake NDR 214 from User C.

The final case is illustrated with respect to User C—where the user sends a self-addressed email. This may occur, for example, when the user carbon copies themselves on an email to others. Again, since the original email 220 is an outbound message from User C destined for himself or himself and (possibly) others, this email should be guaranteed to be delivered to User D. Because spammers and virus writers have developed techniques of falsifying return addressing headers in email messages, filters may recognize emails to one's self as false positives.

The invention addresses the problem of validating inbound messages by using a latent identifier in an inbound message which is tied to an outbound message generated by a messaging system. The identifier is latent in that it is present in the message, but generated by the messaging system without intervention or even knowledge of the user. In one embodiment it uses an existing messaging field to carry the identifier. According to recognized messaging standards, the identifier in the original message is sent back in the inbound message and used by the messaging system to characterize the message. In this manner, validated messages can be treated differently than un-validated messages.

FIG. 3 generally illustrates the method for creating a cryptographic identification for each email message. At step 302, the user drafts a new outbound message and submits the message to the messaging system. Next, at step 304, the messaging system builds cryptographic I.D. using a secret key and metadata from the outbound message. As will be discussed below, this key may be a form of symmetric or asymmetric cryptography and may be used to verify the presence of the cryptographic identifier in a received message. Finally, the messaging system sends the email to its intended recipients with the cryptographic identifier in step 306.

FIG. 4A illustrates an exemplary outbound email 402 and reply email 404. These messages are described in IETF Request For Comments (RFC) 822 entitled "Standard for the Format of ARPA Internet Text Messages" and RFC 2822 entitled "Internet Message Format". These standards specify syntax for text messages that are sent between computer users within the framework of "electronic mail" messages. RFC 2822 supersedes RFC 822, updating it to reflect current practice and incorporating incremental changes that were specified in other RFCs.

As shown in FIG. 4A, an outbound message includes a number of required fields and a number of optional, but recommended fields. One such optional, but strongly recommended (referred to in RFC 2822 as a "should-have" field) is the Message-ID field. The Message-ID field generally provides a unique message identifier that refers to a particular version of a particular message. Normally, message identifiers must be a global unique identifier for each message. The generator of the message identifier must guarantee that the Message-ID is unique. Reply 404 also includes its own Message-ID and, since this is a reply to message 402, an "In-Reply-To" field 404a. The in reply to field contains the unique Message-ID of message 402. Like the Message-ID field, the "In-Reply-To" field is a "should-have" field in accordance with RFC 2822. The "In-Reply-To" field will contain the contents of the "Message-ID:" field of the message to which this one is a reply (the "parent message.")The "In-Reply-To" field will contain the contents of all of the parents' "Message-ID" fields. If there is no "Message-ID" field in any of the parent messages, then the new message will have no "In-Reply-To" or "References" field.

In accordance with the present invention, a cryptographic identifier is incorporated into the Message-ID of the outbound message. The format of the cryptographic identifier used in one embodiment of the invention is shown in FIG. 4B, and the method of creating it is shown in FIG. 4C.

In accordance with this invention, the Message-ID field 406 will include a local part [localpart], random data bytes [R], the encrypted identifier [MAC], one or more optimization "hints", including a recipient hint [RH] and a time interval hint [TH] and a version information [V]. In the following example, the cryptographic identifier includes at least the encrypted ID, which in the example consists of a message authentication code (MAC). A MAC is generally defined as an authentication tag derived by applying an authentication scheme, together with a secret key, to a message. Generally, MACs are computed and verified with the same key, making the encryption "symmetric." However, it should be understood that the encrypted ID in the above description can comprise any digital identifier, including a digital signature, verified using any encryption method, whether symmetric or asymmetric. The cryptographic ID includes the various parts of the Message-ID in conjunction with the encrypted ID. The local part and random data guarantee that the Message-ID will be unique. It should be recognized that uniqueness may be ensured by means other than the use of random data. The hints are used to speed the characterization of the message, as described below. These hints provide the messaging system with a quick indication of whether or not to even check the encrypted identifier. In one embodiment, the recipient hint is the same as the account name with all the bytes XORed together. In one embodiment the time interval hint may be the time interval identifier XORed down to one byte. It should be recognized that any method of reducing the byte count to create an optimization hint may be used, and the invention is not limited to hash or XOR functions. The time interval identifier can be simply an identifier of a given day, or some other quantized representation of time. As discussed below, a range interval is checked when the inbound message is received and ID's therefore have a lifetime value. Use of the random number in the encrypted ID adds randomness to the hash. In one embodiment, the hash is a SHA-1 hash of this material. The version identifier is utilized so that the signature components may change while allowing the receiving system to adapt to such changes. In alternative embodiments, neither the hints nor the version identifier or both are not required.

In FIG. 4B, the encrypted ID is identified as a MAC. As shown in FIG. 4C, the MAC is generated by using a hash of key material 402, the sending account name 408, (for example, user@domain.com,) a quantized time interval identifier 410, and random data 412. The key material 416 is fundamental to security. The sendingaccount name is the sending user's email address for the message. To create the MAC, the random bytes (which in this example includes 5 random bytes) are concatenated. Next, the hash is XORed with itself down to five bytes, and then the single bytes of the two hints are appended. This sequence of twelve bytes is then HEX encoded to avoid any compatibility problems with non-alphanumeric characters, thereby forming a 24 byte string. Finally, the version identifier, which in one embodiment is a hex-encoded binary zero, will be appended. The various parts of an example cryptographic ID formed into a Message-ID are identified at 406 in FIG. 4B. In the aforementioned example, the key material used to generate the hash is used to generate test signatures which are tested against inbound messages. As noted above, other alternatives of creating an encrypted identifier may be used in accordance with the present invention, including asymmetric encryption alternatives such as a PKI signature.

In general, ID's may be generated by the messaging system which may include the mail user agent (MUA) and/or message transfer agent (MTA), as well as various filters and other applications which interact with the MUA and MTA. The method is performed to generate an ID in a manner by which the sender has tacitly opted into the process.

FIG. 5 illustrates the method for determining whether a message received is valid for a particular user. When an email is received at step 502, a step 504 first determines whether a cryptographic identifier is present. The steps for determining whether the encrypted identifier is present are detailed in FIG. 6. Because not all messaging systems comply with the "should-have" specifications of RFC 822/2822, if the cryptographic identifier is not present, the message may nevertheless still be a valid message. The decision on how to treat inbound reply, NDR and self-addressed messages not having a cryptographic identifier should be made by the messaging system administrator or the user. In accordance with the method, if the cryptographic ID is not present, messages which do not have the cryptographic identifier are processed per a user, administrator or implementation-defined specification at step 506. In one embodiment, the system administrator may choose to forward such messages directly to a "spam" filter, may treat them as any other email would be treated in the system, may mark them with a different icon in a user inbox, or may direct them to a special folder of the user.

If the cryptographic ID is determined to be present at step 508, first a check is made to determine whether the optimizations hints merit continuing with checking the cryptographic identifier. For each distinct recipient/time combination to be tested, the hints are checked first at step 508 to quickly identify failed messages. At step 508, if the optimizations do not pass, again, the email can be processed as defined by the user or system administrator at step 510. It should be noted that at step 510, such processing can account for the fact that the identifier is known to be invalid, rather than just unknown as in step 506. Hence, treatment of the message may be more negative. If the optimizations indicate that the email should be checked, then the cryptographic identifier is checked against computed test signature values.

At step 512, the inbound message is characterized by generating a test using the account receiving the email (envelope recipient) in the hash computation along with the current valid range or time interval identifiers to produce valid test signatures. The test signatures are then compared with the extracted ID. If a test signature matches the one in the Message-ID, at step 514, this information is used to characterize the email as valid. If it does not match, it is processed per the user or administrator's specification at step 516. If it does pass, it is sent to the user at step 518. The method is completed at step 520. The current valid range of time interval identifiers is a range used by the messaging system to prevent spammers from circumventing the system. Each signature are accorded a lifetime. This lifetime is defined in a range which is checked when the Message-ID is returned to the system. The signature lifetime may be configured within any range of times, one example of which is 1 to 30 days.

Figure 6:
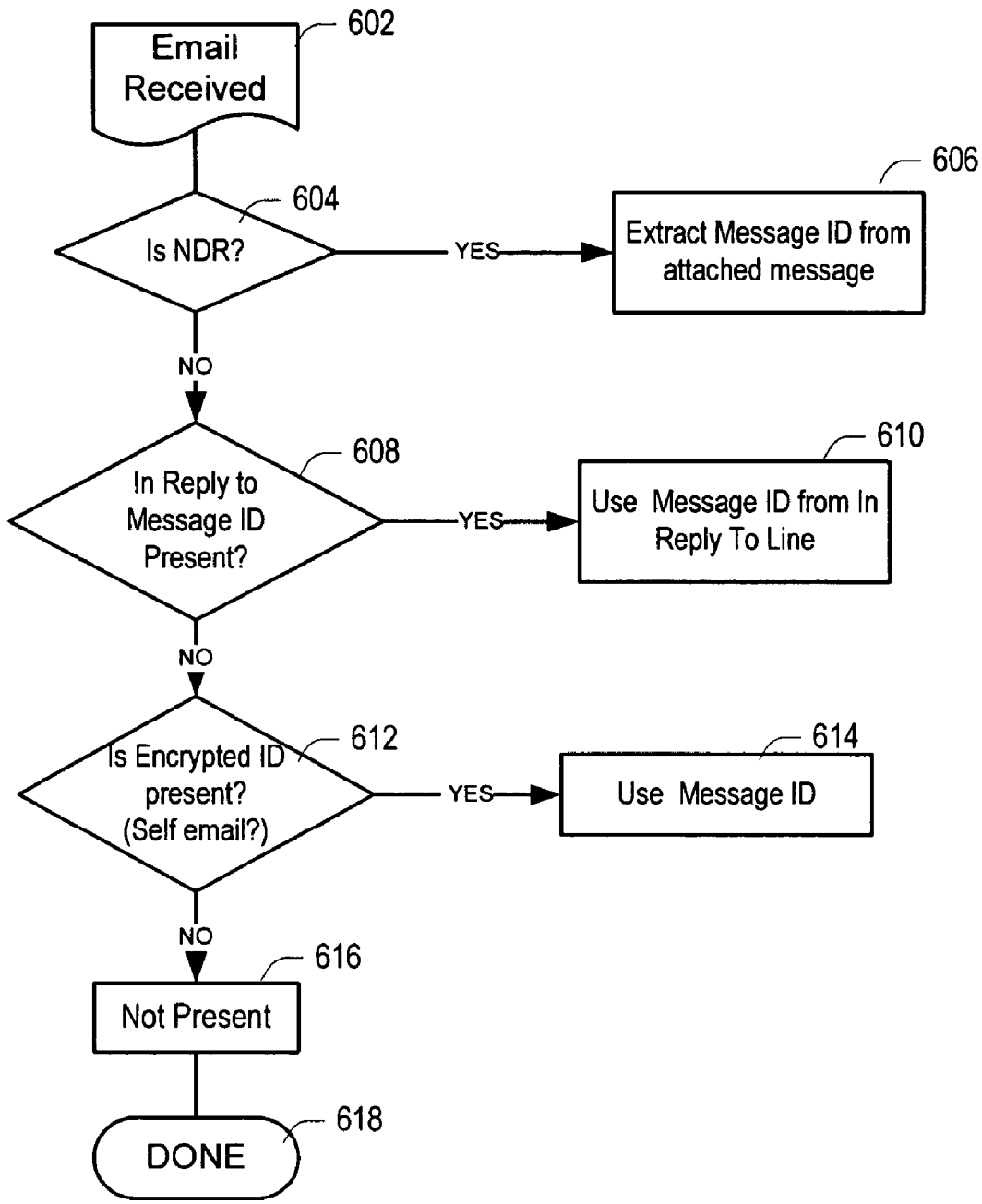
FIG. 6 is a flowchart illustrating a method for determining whether the Message-ID of FIG. 4B is present in a received message.

FIG. 6 illustrates the method for extracting the Message-ID for the various types of emails. As email is received at step 602, the mail is examined to determine whether it is a non-delivery report at step 604. NDR's are defined in accordance with IETI RFC 1894 "An Extensible Message Format for Delivery Status Notifications (DSNs)." A DSN can be used to notify the sender of a message of any of several conditions: failed delivery (an NDR), delayed delivery, successful delivery, etc. If the message is an NDR, (as determined by either a Return-Path: of "< >" and/or message Content-Type: of "multipart/report; report-type=delivery-status",) the Message-ID from the attached message in accordance with the RFC 1894 is determined. If the inbound message is not an NDR, a test is made at step 608 to determine whether the message is a reply message. If so, at step 610, the In-Reply-To field in the inbound message is checked at step 608. In one embodiment, only the first In-Reply-To field is checked. This prevents spammers from attacking a system implementing the method using brute-force attacks. It the message is not a Reply, at step 612 the Message-ID field is checked against all recipients to determine whether this is a self-addressed email. This identifies the inbound message as a self-addressed message at step 612. If none of the conditions are met, the cryptographic identifier is determined not to be present at step 616.

Figure 7:
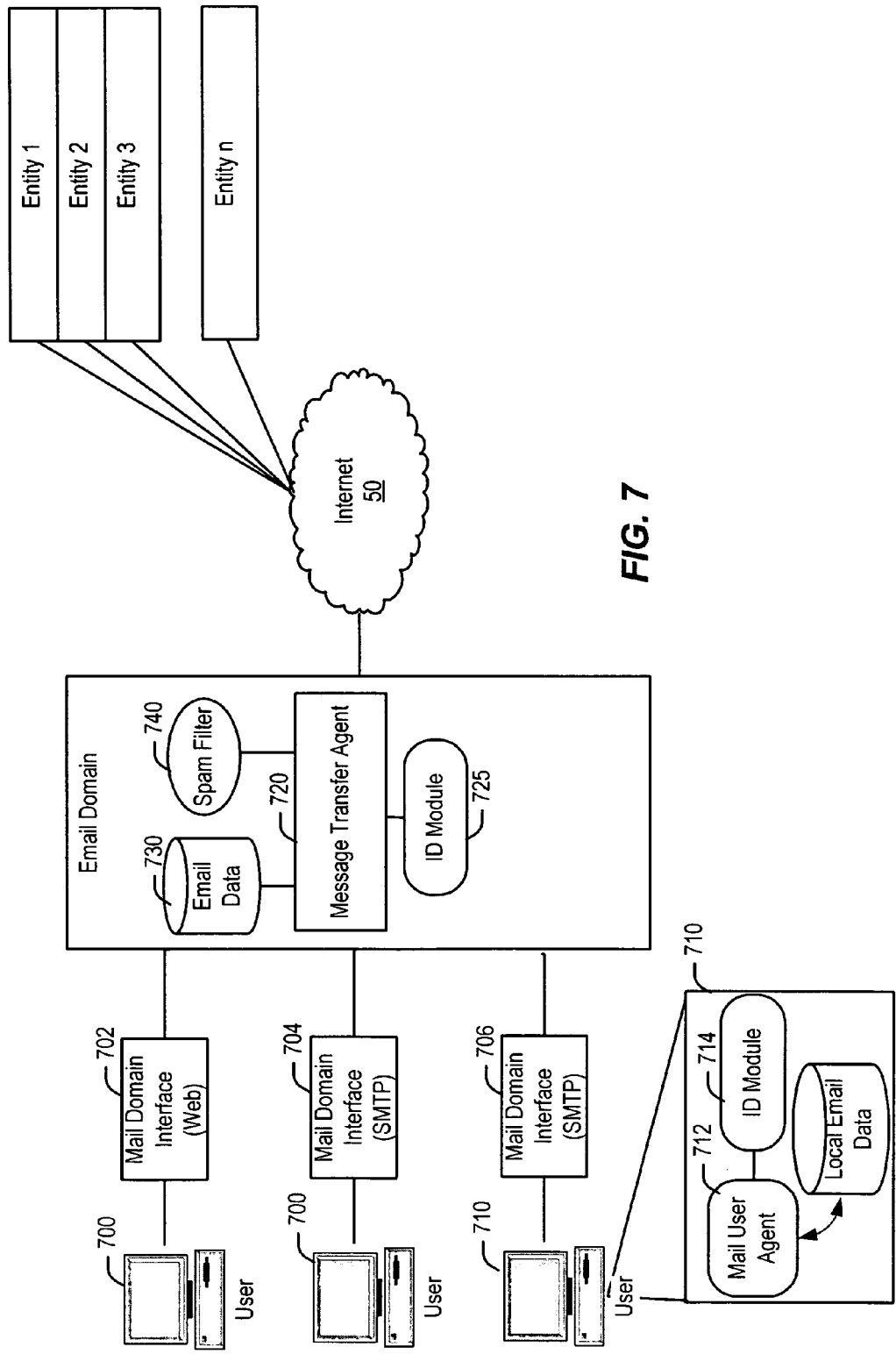
FIG. 7 is a block diagram of an internet messaging system suitable for practicing the present invention.

FIG. 7 illustrates messaging system suitable for practicing the invention. The messaging system may incorporate one or more user devices 700, 710, a messaging server 750 and one or more server interfaces 702, 704, 706. Devices 700, 710 and 750 may all be comprised of one or more processing devices 100 as described in FIG. 1. The server 750 may include a message transfer agent 720 which transfers messaging data to a message data store 730. A spam filter application 740 may be incorporated with the message transfer agent 720 or may operate in conjunction with the transfer agent to filter spam before or after a message is handled by the message transfer agent. In one embodiment, mail server 750 includes an ID module application, including instructions for causing the processing device to implement the methods described above with respect of FIGS. 3-6. The id module 725 may be incorporated into or cooperate with the message transfer agent 720. Each user device may include a mail user agent 712 which transfers outbound messages to the mail server 750 and inbound messages to a local data store 716. Optionally, the methods described above may be performed at the mail user agent by incorporating an ID module 714 into the user's processing device. In one embodiment where the ID module may be used with a MIME compliant MTA, and may be incorporated into at least one source code file compiled by the message transfer agent, and a header file which may provide the following functions:

Initialize secret key, random data;
Generate Message-ID using AccountName, and outputting encrypted Message-ID;
Is Valid Message using InReplyToValue, and Recipient;
Is Valid Reply using InReplyToValue, and Recipient;
Is Valid NDR using Message-ID, and Recipient;

A MIME parser may be provided in the MTA to allow the library to get content types, MIME parts, and the original Message-ID from NDRs. Other alternatives may also be used.

Post processing of messages characterized by their cryptographic identifier can take several forms. However, because some types of email systems do not rely on the RFC 822/2822 "should" specified "In-Reply-To" or "References" behavior, messages which do not contain the cryptographic identifier cannot be unilaterally adversely treated. However, messages which do contain the identifier can be validated and known with certainty that they are from the originating email domain system.

Once the system has characterized the message, this information can be used to process the message in a number of ways. In one example, the information can be used positively—processing can comprise allowing "valid" messages to bypass spam filters. In addition, the known "valid" signatures can be used to facilitate monitoring and metrics of the messaging system. For example, known "valid" messages can be submitted to the spam filters and false positives rates of the filters determined. In addition, the verification process can be used as part of a complaint verification process. Messages sent to recipients which are accused of coming from a particular messaging system implementing the verification method of the invention can be determined with certainty to have nor not to have come from the system. In yet another alternative, spam filter processing can be adjusted based on the measured performance of the filters vs. known valid messages. As such, processing time on the processing device can be saved by running the spam filters only a portion of the time based on the measured false positives.

In addition, metrics about non-spam behavior can be used relative to the spam in the system. Extrapolations of user behavior patterns can be used to gauge overall non-spam inbound traffic.

The characterization of the message can result in positive or negative treatment of the message. Where the message is determined to be valid, the post processing may comprise automatically providing the reply user on an "auto-safe list". Safe lists are lists stored by spam filters of known email senders which are allowed to bypass spam filters. The system can automatically add validated message senders to this list. Alternatively, messages marked as valid or invalid can be displayed to the user with a unique icon.

When treating characterized messages negatively, care must be taken to recognize that not all messaging systems capable of generating replies or NDRs will conform to RFC 822/2822. It is also conceivable that one might receive a valid reply with a cryptographic identifier falling outside the time range. Hence, negative treatment of inbound messages which are not validated can be made probabilistic, based on the aforementioned metrics.

Although the system of the present invention uses the Message-ID as the component of the email message which contains the cryptographic identifier, other fields or message components may be utilized. The Message-ID field is advantageous as it is generally guaranteed to be returned with a reply, NDR or self-addressed email. In addition, while the system of the present invention utilizes certain components to build the MAC, other components may be utilized. Elements which may be used in the message authentication generating hash include the account name, the domain name of the account, the time of message transmission, the subject of the message, a portion of the subject of the message, including the last end characters of the subject, or other components. In a further embodiment, only RFC 822/2822 In-Reply-TO; headers are examined. In yet another embodiment, only RFC 1894 messages are considered proper failure reports.

In still another embodiment, it should be understood that the hints set forth above are optional. In a further embodiment, a symmetric hash is not utilized. Rather, additional signature that can be used to authenticate the identity of the sender of the message is utilized. An asymmetric encryption incorporates two separate keys, one of which can be utilized to decrypt the cryptographic identifier. It should further be recognized that the system which generates the cryptographic identifier need not be the messaging system which verifies the cryptographic identifier. Secret key information may be shared with other, trusted email entities to allow such entities to verify the email as coming from another, trusted or known system.

In yet another embodiment, the key material may be split into a code key and a separate secret key. In this manner, the code can be built in to the email server utilized in the email domain so that a potential attacker attempting to steal the key must steal both the code key and the secret key (two separate elements) to be successful. In one embodiment, the messaging server is a web-based email domain utilized for services such as Microsoft® Hotmail. In such cases, the characterization methods can be utilized to run a check against outbound mail logs to optimize the system's spam filters.

As noted above, in one aspect, the key information is divided into both a secret key and a code key. In such an embodiment, the secret key and the code key are shared between all computers generating and receiving e-mails (the recognized systems). However, knowledge of this key would let a spammer send messages exempted from anti-spam filtering to all domain users. This may create a desire in spammers to break into domain mail servers. A likely scenario might include an attacker installing a backdoor into one of domain servers and stealing the key whenever it gets updated. The break-in would go undetected unless the spammer blows his cover by spamming an extraordinary amount of domain users.

One way to protect the domain against this threat is to use different keys on different server machines. This allows the keys to be easily revoked once a break-in is detected. In another embodiment, messages carrying valid identifiers can be subjected to random checks, and breaches can be detected automatically.

Splitting the key between different machines can be done in several ways. In one aspect, it can be achieved by using signatures. A signature is generated using a private key (stored only on the outbound servers) and verified using a public key (stored on the inbound servers). Potentially, one can have as many private-public key pairs as there are outbound servers. A special class of signatures, called group signatures, simplifies key management by letting a large number of private keys, which can be independently revoked and updated, share the same public key. In this scenario, every outbound server has its own private key (very valuable for the attacker, but easily revocable) and all inbound server share the same (low-security) public key. A successful attack on the system would be limited in time and scope, since by manually breaking into an outbound server the attacker only gains temporary access to the server's key.

A simpler method that does not involve public-key cryptography is to make the MAC key dependent on the outbound server (host). One mechanism for this is to let the key be the hash of a secret key "K", the host name, and a counter. The hosts receive the keys, which are independent from each other. The inbound servers have the secret key and can recompute the key for each host. By re-computing the key for each host, the distribution of the high security key to the inbound servers is limited. As in the previous embodiment, the host keys can be independently updated.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for interpreting messages, comprising:
   receiving an inbound message, wherein the inbound message includes a plurality of fields, a first of said fields including a unique message identifier, said message identifier further incorporating a latent cryptographic identifier as part of the message identifier, said latent cryptographic identifier being generated by a recognized message system for inclusion in outbound messages and including at least one optimization hint; and
   characterizing the inbound message by analyzing the latent cryptographic identifier in the inbound message.

2. The method of claim 1 wherein the step of characterizing comprises:
   detecting if a latent cryptographic identifier generated by a recognized messaging system is present; and
   determining if the cryptographic identifier is valid.

3. The method of claim 2 further including the step, prior to said step of determining, of checking said at least one optimization hint in the identifier to determine whether a more detailed determination of the identifier is required.

4. The method of claim 3 wherein the optimization hint is a recipient hint.

5. The method of claim 3 wherein the optimization hint is a time hint.

6. The method of claim 1 further including the step of generating an outbound message including said identifier.

7. The method of claim 6 wherein the step of generating comprises inserting said identifier in a Message-ID field of an email message.

8. The method of claim 6 wherein the step of generating includes encrypting message metadata.

9. The method of claim 8 wherein the message metadata is the account name originating the message.

10. The method of claim 8 wherein the message metadata is the domain of account originating the message.

11. The method of claim 8 wherein the message metadata is the time of message transmission.

12. The method of claim 8 wherein the message metadata is the subject field of the message.

13. The method of claim 8 wherein the message metadata is a portion of subject field metadata selected by skipping a number of characters at the beginning of the subject field.

14. The method of claim 8 wherein the message metadata includes the email address of the recipient of the original message 15. The method of claim 1 wherein each said step of characterizing comprises examining a Message-ID header field in an email message.

16. The method of claim 1 wherein said message is a failure report of original message delivery.

17. The method of claim 16 wherein the step of characterizing comprises examining a Message-ID in headers of the original message attached in the failure report.

18. The method of claim 1 wherein said inbound message is a reply to original message.

19. The method of claim 18 wherein the step of characterizing comprises examining a Message-ID found in an In-Reply-To header.

20. The method of claim 18 wherein the step of characterizing comprises examining a Message-ID found in an References header.

21. The method of claim 1 wherein the step of characterizing comprising comparing a keyed-hash of message metadata against test signatures.

22. The method of claim 1 wherein the step of characterizing comprising verifying a PKI encryption of message metadata.

23. A computer-readable medium having computer-executable instructions for performing the steps recited in claim 1.

24. A method for validating an inbound email in a messaging system, comprising:
extracting a cryptographic identifier generated from a known originating system from the inbound email;
checking at least one optimization hint in the identifier to determine whether a more detailed determination of the cryptographic identifier is required; and if a detailed determination is required,
comparing a portion of the cryptographic identifier against a number of known valid MAC values to determine whether the message originated with the known originating system, and if so, generating a positive comparison, and
processing the email based on the positive comparison including bypassing at least a portion of a spam filter.

25. The method of claim 24 wherein the known originating system is the messaging system.

26. The method of claim 24 wherein said step of comparing generates a negative comparison if the message did not originate with the known originating system, and If so, the method further includes the step of processing the message based on said negative comparison.

27. The method of claim 26 wherein the processing comprises displaying a different icon for the message.

28. The method of claim 26 wherein the processing comprises routing mail to a specific folder.

29. The method of claim 26 wherein the processing comprises forwarding mail for analysis by a spam filter.

30. The method of claim 26 wherein the processing comprises storing mail sent with negative comparisons for analysis.

31. The method of claim 26 combining key identification with virus scanning to provide an early warning system for viruses.

32. The method of claim 26 wherein said processing includes treating failure reports not passing the check pejoratively.

33. The method of claim 32 where pejorative treatment amount to hiding the message from the user.

34. A messaging system, including:
an identifier generator providing a cryptographic identifier for each message handled by the message transfer agent, wherein each message includes a plurality of fields, including a standard identification field encoded with a unique message identifier, said cryptographic identifier being incorporated as part of the message identifier, each cryptographic identifier generated including at least one optimization hint; and
an identifier characterizer interpreting the content of the standard identification field in inbound messages to the messaging system.

35. The messaging system of claim 34 wherein the identifier generator is incorporated into a mail user agent.

36. The messaging system of claim 34 wherein the identifier generator is incorporated into a messaging transfer agent.

37. The messaging system of claim 34 wherein the identifier characterizer is incorporated into a messaging transfer agent.

38. The messaging system of claim 34 wherein the identifier characterizer is incorporated into a mail user agent.

39. The messaging system of claim 34 further including a spam filter.

40. The messaging system of claim 39 further including the step of comparing an output of the characterizer to message decisions by the spam filter.

41. The messaging system of claim 39 wherein spam filters are run only fraction of the time, and a false-positive rate is extrapolated.

42. The messaging system of claim 39 wherein the messaging system includes a transmission log, and the identification is used as optimization against transmission log check.

43. The messaging system of claim 39 wherein the spam filter is run less often as a result of identification is used an optimization to reduce the load on the system resulting from running the spam filters.

44. The messaging system of claim 34 wherein the system further includes at least a first server and a second server, and the generator and the characterizer are provided on each of said first and second server, and each first and second server includes a different encryption key.

45. The messaging system of claim 34 wherein the system further includes:
a plurality of inbound servers and a plurality of outbound servers,
at least one said generator provided on each of said plurality of outbound servers,
at least one said characterizer provided on each of said plurality of inbound servers,
each said generator provides a signature using one of a plurality of unique private keys stored on said outbound server, and
each said verifier validates a signature using a public key stored on each said inbound server.

46. A method for validating email, comprising:
generating an latent cryptographic identifier in each outbound message output by a messaging system , the identifier including at least one optimization hint and an encrypted unique identifier; and
upon receipt of any inbound message by the messaging system:
determining whether the latent cryptographic identifier in the inbound message is present;
examining the optimization hint and extracting the encrypted identifier from the cryptographic identifier; and
comparing the encrypted identifier against a number of known valid encrypted identifier to determine whether the inbound message originated with the messaging system.

47. The method of claim 46 wherein the encrypted identifier is a message authentication code.

48. The method of claim 46 wherein the cryptographic identifier includes at least one optimizer component.

49. The method of claim 48 wherein the method further includes the step, prior to the step of extracting, of checking the optimizer component to determine whether to perform said extracting and comparing steps.

50. The messaging system of claim 34, wherein the standardized identification field of each message includes the unique message identifier, the cryptographic identifier, a local part, random data bytes, at least two optimization hints including a recipient hint and a time interval hint, and a version information.

* * * * *